United States Patent [19]

Ring

[11] 3,986,439

[45] Oct. 19, 1976

[54] PISTON AND SLIPPER ARRANGEMENT FOR HYDRAULIC PUMP OR MOTOR

[75] Inventor: Curtis Phillip Ring, Cedar Falls, Iowa

[73] Assignee: Deere & Company, Moline, Ill.

[22] Filed: Nov. 25, 1974

[21] Appl. No.: 526,857

[52] U.S. Cl. .................................... 92/158; 91/488; 92/181 P; 92/248; 138/40; 138/42

[51] Int. Cl.$^2$ .......................... F15D 1/00; F16J 1/08

[58] Field of Search ............ 92/158, 159, 181, 157, 92/248, 249; 91/488; 138/40, 42

[56] References Cited

UNITED STATES PATENTS

| | | | |
|---|---|---|---|
| 3,586,104 | 6/1971 | Hyde | 138/42 X |
| 3,741,077 | 6/1973 | Hulsebus et al. | 92/248 X |
| 3,828,654 | 8/1974 | Wiethoff | 92/158 X |
| 3,861,278 | 1/1975 | Forster | 92/181 X |
| 3,873,030 | 3/1975 | Barragan | 138/42 X |

*Primary Examiner*—Irwin C. Cohen

[57] ABSTRACT

A piston and slipper arrangement for a hydraulic pump or motor includes a tortuous fluid flow passage through the piston to a fluid pressure recess in the thrust face of the slipper at the opposite end of the piston. The fluid passage is formed by a plurality of spaced, cylindrical pockets interconnected by restricted flow channels which tangentially join the pockets.

9 Claims, 3 Drawing Figures

PISTON AND SLIPPER ARRANGEMENT FOR HYDRAULIC PUMP OR MOTOR

BACKGROUND OF THE INVENTION

The present invention relates generally to restricted flow passages and to piston and slipper arrangements used in hydraulic pumps and motors of either the axial or radial piston type and of either fixed or variable displacement, and more particularly relates to a piston structure which utilizes a novel restricted flow passage to control the flow of fluid to the slipper thrust or bearing surface.

In order to reduce power loss and wear due to the contact between a piston slipper and a reaction member, it has been known to provide a fluid passageway through the piston to a recess in the thrust face of the piston slipper so that fluid pressure at the inner end of the piston is also available at the recess and acts between the slipper and reaction member to exert a separating force between the two and provide a film of oil on which the slipper rides. The ideal arrangement is to size the recess in the slipper so as to obtain a complete hydrostatic balance without any significant leakage. That is, the force exerted by the fluid pressure at the inner end of the piston should be exactly equal to the force exerted by the fluid pressure between the slipper and reaction member and there should be no appreciable leakage across the land of the slipper. However, because of manufacturing tolerances and varying operating conditions, such an idealistic arrangement is difficult to achieve by proper sizing of the slipper recess.

It has been proposed to overcome the above described problem by providing a sufficiently large recessed area in the slipper so the force at the slipper is, at all times, at least as great as the force at the inner end of the piston, and to provide a restriction in the flow passage through the piston so that whenever excessive leakage occurs there will be a pressure drop across the restriction with the result that the fluid pressure separating the slipper from the reaction member will be reduced and the slipper will settle down to its normal position. Examples of this are shown in U.S. Pat. No. 3,828,654 which issued to Roger H. Wiethoff on Aug. 13, 1974 and U.S. Pat. No. 3,188,973 which issued to Firth et al. on June 15, 1965. The major problems with such a solution is that in order to obtain the necessary pressure drop through the piston the restriction is so small it is subject to plugging, and plugging would result in a loss of pressure at the recess and a rapid failure of the slipper and reaction member.

SUMMARY OF THE INVENTION

One object of the present invention is to provide a tortuous fluid passage which restricts fluid flow and which provides a relatively high restriction without the use of restrictions which are so small as to be subject to plugging.

Another object of the invention is to provide a tortuous fluid passage formed by a plurality of pockets interconnected by flow channels.

Still another object of the invention is to provide a tortuous flow passage formed by a plurality of cylindrical pockets formed by a plurality of flow channels which extend tangentially to the pockets.

A further object of the present invention is to provide an improved piston and slipper arrangement for hydraulic pumps and motors in which the piston includes a tortuous fluid passage therethrough providing communication between the recess in the thrust face of a slipper mounted on one end of the piston and the opposite end of the piston, the bleed passage being interconnected by a plurality of pockets interconnected by restricted flow channels.

Yet another object of the present invention is to provide a piston and slipper arrangement as aforesaid in which the tortuous flow passage through the piston is formed by a plurality of cylindrical pockets interconnected by a plurality of flow restricting channels which extend tangentially to the pockets. With this construction, during periods when the leakage across the lands of the slipper in excessive, not only do the channels restrict flow to provide a pressure drop, but the cylindrical pockets also set up a vertex. In order for the oil to get through the channel after each pocket, it must reverse itself from the vortex condition, thus increasing the pressure drop.

The above objects and additional objects and advantages of the present invention will become apparent to those skilled in the art from a reading of the following detailed description of a preferred embodiment when read in conjunction with the accompanying drawing.

DESCRIPTION OF THE PREFERRED EMBODIMENT

Figure 1:
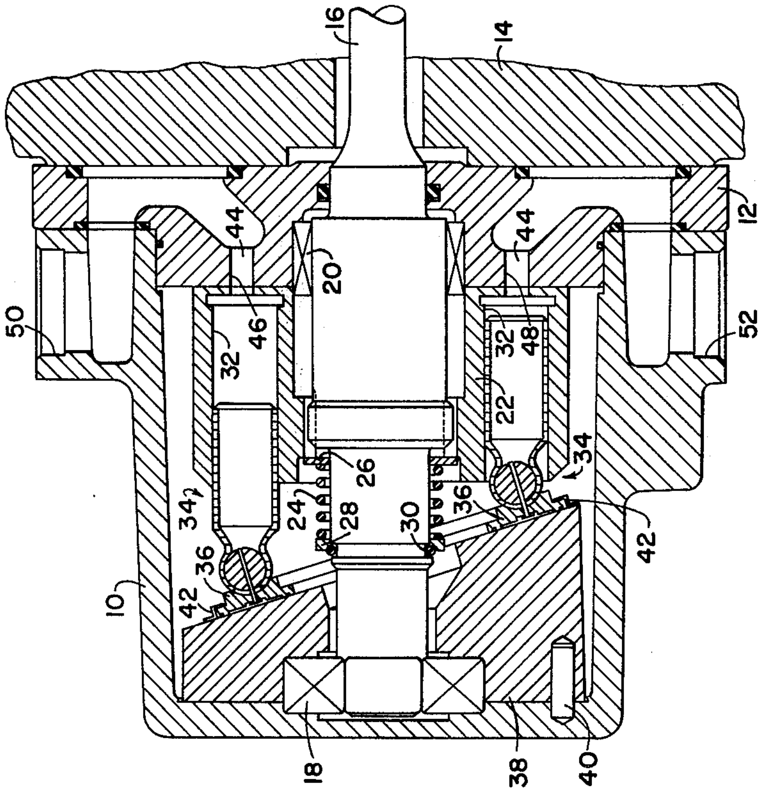
FIG. 1 is a sectional view of a pump and motor employing a piston and slipper arrangement according to the present invention.

As an exemplary illustration of the environment in which the present invention is useful, a pump or motor is illustrated in FIG. 1 and includes a housing 10, a valve plate 12 and an end plate 14, all of which are held together in any suitable manner. A drive shaft 16 is journaled in the housing and valve plate by bearings 18 and 20 and projects through the end plate 14. A rotor or cylinder barrel 22 is keyed to the drive shaft 16 for rotation therewith and has a flat end face normally held in engagement with a flat valve face on the valve plate 12 by a spring 24 which acts between a first ring 26 engaging the cylinder barrel and a second ring 28 engaging a snap ring 30 fixed to the drive shaft 16.

The cylinder barrel 22 is provided with a plurality of generally axially extending cylinders 32 which are open away from the flat face, and a plurality of pistons indicated generally at 34 are reciprocally mounted in the cylinders and project from the open ends thereof. Slippers 36 are articulately mounted on the projecting ends of the pistons and slidably engage a cam surface on a cam or reaction member 38 which surrounds the drive shaft 16 and is keyed to the housing 10 as at 40. The slippers 36 are loosely retained against the cam surface by a retaining ring 42.

The inner ends of the cylinders 32 are in communication with the flat end face of the cylinder barrel through passages 44 which are in alignment with kidney-shaped ports 46 and 48, in the valve plates 12. The ports 46 and 48 are, in turn, in communication with ports 50 and 52, respectively, in the housing 10.

The structure thus far described is conventional and, as is understood by those skilled in the art, will operate as either a pump or motor. If fluid pressure is supplied to one of the ports 50 and 52 and exhausted from the other, the described structure will operate as a motor and rotate the drive shaft 16. If the drive shaft 16 is driven mechanically by an external source so that fluid is drawn through one of the ports 50 and 52 and exhausted at a high pressure through the other, the described structure operates as a pump.

Figure 3:
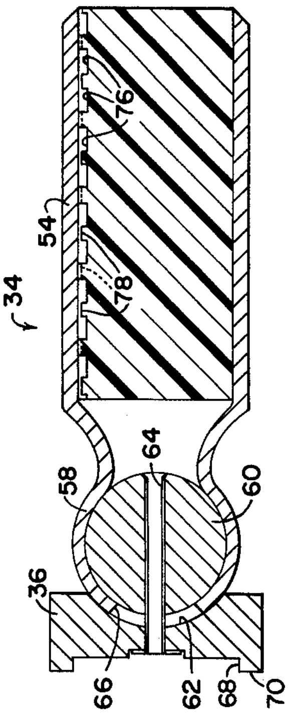
FIG. 3 is a sectional view through a piston and slipper arrangement taken generally along the lines 3—3 of FIG. 2.
Figure 2:
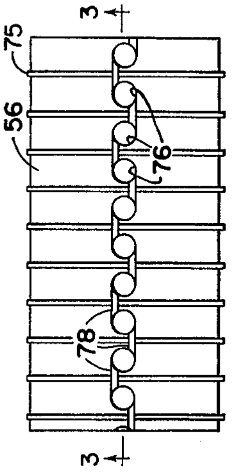
FIG. 2 is a plan view of an insert for a hollow piston body according to the present invention.

The improved piston and slipper arrangement according to the present invention is best illustrated in FIGS. 2 and 3 and includes a hollow piston body 54, a piston body insert 56, and the slipper 36. The end of the piston body which will extend from the cylinder is provided with a generally spherical head 58 and a ball 60 is retained therein. The slipper 36 has a dished surface 62 which is complementary to and in engagement with the spherical head 58. The slipper 36 is retained in engagement with the spherical head 58 by a hollow rivet or other suitable hollow fastener 64 which extends through the slipper and ball. A portion of the spherical head 58 has been removed as at 66 so that the fastener 64 does not interfere with universal movement of the slipper 36 on the spherical head 58.

The thrust face of the slipper 36 which, during use, will be in engagement with the cam or reaction member is provided with a central recessed area 68 defined by land 70. The recessed area 68 in the thrust face of the slipper 36 is in communication with the interior of the hollow piston body 54 through the hollow fastener 64. The slipper 36 and the recess 68 are sized so that, if the fluid pressure available at the recess is equal to the fluid pressure at the inner end of the piston, the force exerted on the slipper will be greater than the force exerted on the inner end of the piston. Since the pressure drop across the land 70 will be substantially linear, the cross sectional area of the piston body 54 will be greater than the area of recess 68 and less than the area of the thrust face of the slipper. The cross sectional area of the piston body should be slightly less than the area of the recess 68 plus one half the area of the land 70.

The material from which the insert 56 for the hollow piston body 54 is constructed forms no part of the present invention, but is preferably formed from a lightweight synthetic material in order to keep the mass of the piston at a minimum. The outside diameter of the insert 56 is slightly less than the inside diameter of the hollow piston body 56, but is provided with a plurality of circumferentially extending ridges 75 which have an outside diameter slightly greater than the inside diameter of the hollow piston body. When the insert 56 is positioned in the hollow piston body, the ridges 75 are compressed and partially sheared off so as to provide a snug fit between the insert and piston body.

The surface of the insert 56 is provided with a row of spaced, cylindrical shaped pockets 76 which are interconnected by a plurality of flow channels 78 which extend tangentially to the pockets 76. The pockets 76 and channel 78 form a flow passage through the piston so that fluid at the inner end of the piston (the right end as viewed in FIG. 3) is free to flow to the recess 68 in the thrust face of the slipper 36. The channels 78 are made small enough so that they function as orifices to restrict the flow of fluid between pockets and preferably have a width of approximately one-fourth the diameter of the pockets and a depth no greater than the depth of the pockets. The ridges extend between the pockets so that, when the insert is positioned in the piston body, they provide a seal which prevents leakage between the pockets other than through the channels.

Assuming that the apparatus shown in FIG. 1 is operated as a motor, the operation of the motor and the improved piston and slipper arrangement is as follows. Fluid pressure will be supplied through the port 52 to the pistons on the high side of the cam traveling towards the low side so that the hydraulic pressure exerted on the pistons will act through the piston and slipper on the cam 38 to cause rotation of the cylinder barrel 22 and drive shaft 16. The fluid supplied to the cylinders 32 will flow through the channels 78 and pockets 56 in the insert 56, and through the hollow fastener 64 to the recessed area 68 in the thrust face of a slipper 36. The fluid pressure in the recessed area 68 will act on the piston slipper and cam to exert a separating force between the two so that a small amount of fluid will leak across the land 70 to the interior of the housing. This small amount of fluid leakage provides an oil film between the slipper and cam to reduce the friction between the two and normally prevent metal-to-metal contact.

If the separating force between the slipper and cam becomes too great during high pressure operation so that the leakage across the land 70 increases and provides an appreciable power loss, the fluid flow through the piston would increase. Because of the restriction to flow provided by the channels 78 there will be a pressure drop through the piston. Also, with increased flow, the tangential entry to each of the pockets 76 will set up a vortex in a direction opposite to the direction in which the fluid must leave the pocket for flow to the next pocket. This vortex flow will increase the pressure drop through the piston. The pressure drop through the piston will result in a decreased fluid pressure in the recessed area 68 of the slipper 36 so that the slipper can again settle down to the cam 38 and reduce the leakage across the land 70. In this manner the piston and slipper are self-compensating to maintain the minimum amount of leakage required for lubrication and a hydrostatic balance is maintained. The restriction caused by the vortex flow permits a maximization of the size of the channels as they will not be subject to plugging.

Although the invention has been illustrated in conjunction with a fixed displacement axial piston pump or motor, those skilled in the art will realize that the restricted flow passage is applicable to the other areas where flow restriction is required and the piston and slipper arrangement utilizing the restricted flow passage is also applicable to variable displacement pumps or motors and also to radial piston pumps and motors.

Having thus described a preferred embodiment of the invention, various modifications within the spirit and scope of the invention will become apparent to those skilled in the art and can be made without departing from the underlying principles of the invention. Therefore, the invention should not be limited to the specific illustration and description, but only by the following claims.

I claim:

1. A piston and slipper arrangement for use in a hydraulic pump or motor comprising: a hollow piston body; a slipper articulately mounted on one end of the piston and having a thrust face; a recess provided in the thrust face of the slipper; passage means providing communication between the interior of the piston body and the recess provided in the thrust face of the slipper; an insert with a longitudinal axis positioned in the piston body and snugly engaging the interior wall thereof; a plurality of spaced cylindrical pockets formed in the insert with each cylindrical pocket having its axis of revolution at a substantial angle relative to said longitudinal axis of said insert; and a plurality of channels formed in the insert and interconnecting adjacent pockets to form, in combination with the pockets, a fluid passage through the insert to the passage means; the channels joining each pocket being offset from each other and each channel extending tangentially to both of the pockets which it connects.

2. A piston and slipper arrangement as set forth in claim 1 wherein each of the channels has a depth no greater than the depth of the pockets which it interconnects and a width less than one-half the maximum diameter of the pockets whereby the channels form flow restricting orifice passages between the pockets.

3. A flow restricting insert for use in a fluid flow passage having an interior wall, the insert comprising: an insert body with a longitudinal axis having an outer surface configuration to fit within a fluid flow passage and snugly engage the interior walls thereof; a plurality of spaced cylindrical pockets formed in the insert body with each cylindrical pocket having its axis of revolution at a substantial angle relative to said longitudinal axis of said insert; and a plurality of channels formed in the insert body and interconnecting adjacent pockets to form, in combination with the pockets, a restricted fluid passage through the insert body; the channels joining each pocket being offset from each other and each channel extending tangentially to both of the pockets which it connects.

4. A flow restricting insert as set forth in claim 3 wherein each of the channels has a depth no greater than the depth of the pockets which it interconnects and a width less than one-half the maximum diameter of the pockets whereby the channels form flow restricting orifice passage between the pockets.

5. A flow restricting insert as set forth in claim 3 wherein the pockets and channels are open to the surface of the insert body and are adapted to be closed by the interior wall of the fluid flow passage.

6. A piston and slipper arrangement for use in a hydraulic pump or motor comprising: a hollow piston body; a slipper articulately mounted on one end of the piston and having a thrust face; a recess provided in the thrust face of the slipper; passage means providing communication between the interior of the piston body and the recess provided in the thrust face of the slipper; an insert with a longitudinal axis positioned in the piston body and snugly engaging the interior wall thereof; a plurality of spaced cylindrical pockets formed in the insert with each cylindrical pocket having its axis of revolution at a substantial angle relative to said longitudinal axis of said insert, the pockets being open to the surface of the insert and closed by the interior wall of the piston body; and a plurality of channels formed in the insert, the channels being open to the surface of the insert, closed by the interior wall of the piston body, and interconnecting adjacent pockets to form, in combination with the pockets, a fluid passage through the insert; the channels joining each pocket being offset from each other and each channel extending tangentially to both of the pockets which it connects.

7. A piston and slipper arrangement as set forth in claim 6 wherein each of the channels has a depth no greater than the depth of the pockets which it interconnects and a width less than one-half the maximum diameter of the pockets whereby the channels form flow restricting orifice passages between the pockets.

8. A flow restricting insert for use in a fluid flow passage having an interior wall, the insert comprising: an insert body with a longitudinal axis having an outer surface configuration to fit within a fluid flow passage and snugly engage the interior walls thereof; a plurality of spaced cylindrical pockets formed in the insert body with each cylindrical pocket havings its axis of revolution at a substantial angle relative to said longitudinal axis of said insert, the pockets being open to the surface of the insert and adapted to be closed by the interior wall of the fluid flow passage; and a plurality of channels formed in the insert body, the channels being open to the surface of the insert, adapted to be closed by the interior wall of the fluid flow passage, and interconnecting adjacent pockets to form, in combination with the pockets, a restricted fluid passage through the insert body; the channels joining each pocket being offset from each other and each channel extending tangentially to both of the pockets which it connects.

9. A flow restricting insert as set forth in claim 8 wherein each of the channels has a depth no greater than the depth of the pockets which it interconnects and a width less than one-half the maximum diameter of the pockets whereby the channels form flow restricting orifice passage between the pockets.

* * * * *